(12) United States Patent
Parkes (10) Patent No.: US 7,218,572 B2
(45) Date of Patent: May 15, 2007

(54) METHOD OF SEISMIC SOURCE MONITORING USING MODELED SOURCE SIGNATURES WITH CALIBRATION FUNCTIONS

(75) Inventor: Gregory Ernest Parkes, Corsham (GB)

(73) Assignee: PGS Exploration (UK) Limited, Walton-on-Thames (GB)

( * ) Notice: Subject to any disclaimer, the term of this patent is extended or adjusted under 35 U.S.C. 154(b) by 0 days.

(21) Appl. No.: 10/849,673

(22) Filed: May 20, 2004

(65) Prior Publication Data

US 2005/0259513 A1     Nov. 24, 2005

(51) Int. Cl.
*G01V 1/38* (2006.01)

(52) U.S. Cl. ............ 367/23; 367/15; 367/144; 181/118

(58) Field of Classification Search ........... 367/15, 367/21, 23, 144, 141; 181/113, 115, 118, 181/110
See application file for complete search history.

(56) References Cited

U.S. PATENT DOCUMENTS

| | | | |
|---|---|---|---|
| 4,476,550 A | | 10/1984 | Ziolkowski et al. |
| 4,476,553 A | | 10/1984 | Ziolkowski et al. |
| 4,693,336 A | * | 9/1987 | Newman .............. 181/111 |
| 4,868,794 A | | 9/1989 | Ziolkowski et al. |
| 5,184,329 A | * | 2/1993 | Regnault et al. ........ 367/23 |
| 5,200,927 A | * | 4/1993 | Cretin et al. ........... 367/13 |
| 6,018,494 A | * | 1/2000 | Laws .................... 367/23 |
| 6,081,765 A | * | 6/2000 | Ziolkowski ............. 702/17 |
| 6,788,618 B2 | * | 9/2004 | Clayton et al. ......... 367/13 |
| 6,873,571 B2 | * | 3/2005 | Clayton et al. ........ 367/144 |
| 6,901,028 B2 | * | 5/2005 | Clayton et al. ......... 367/68 |
| 2004/0228214 A1 | * | 11/2004 | Tulett .................... 367/15 |

FOREIGN PATENT DOCUMENTS

| | | | |
|---|---|---|---|
| GB | 2204129 | * | 11/1988 |
| GB | 2328017 | | 2/1999 |

(Continued)

OTHER PUBLICATIONS

Johnston, et al. "SEG standards for specifying marine seismic energy source." 1988 Society of Exploration Geophysicists.*
Hobbs and Jakubowicz. "Marine source signature measurement using a reference seismic source." 62nd EAGE Conference Jun. 2, 2000.*
Landro, et al. "Source signature determination by inversion." Geophysics, Dec. 1992.*

(Continued)

*Primary Examiner*—Jack Keith
*Assistant Examiner*—Scott A. Hughes
(74) *Attorney, Agent, or Firm*—E. Eugene Thigpen; Charles R. Schweppe (57) ABSTRACT

Physical parameters are measured for an array of seismic sources, preferably for each activation of the seismic sources. Calibration functions are obtained and the measured physical parameters and calibration functions are applied to a model, which generates a calibrated source signature for the array of seismic sources. Alternatively, the measured physical parameters are applied to a model, which generates a modeled source signature, and then the calibration functions are applied to the modeled source signature to generate the calibrated source signature. Alternatively, modeled source signatures are generated for each seismic source and then the calibration functions are applied to the modeled source signatures to generate a calibrated source signature for each seismic source. Then the calibrated source signatures for each seismic source are combined, preferably by linear superposition, to generate the calibrated source signature for the array of seismic sources.

24 Claims, 8 Drawing Sheets

FOREIGN PATENT DOCUMENTS

WO     WO9410585    *   5/1994
WO     WO9848301    *   10/1998

OTHER PUBLICATIONS

A. Ziolkowski, G. Parkes, L. Hatton, T. Haugland, "The signature of an airgun array: Computation from near-field measurements including interactions", Geophysics, Oct. 1982, pp. 1413-1421, vol. 47, No. 10.

A. Ziolkowski, G. Parkes, L. Hatton. T. Haugland, "The signature of an airgun array: Computation from near-field measurements including interactions—partical considerations", Geophysics, Feb. 1984, pp. 105-111, vol. 48, No. 2.

W.H. Dragoset, "A comprehensive method for evaluating the design of airguns and airgun arrays", Geophysics; The Leading Edge of Exploration, Oct. 1984, pp. 52-61.

* cited by examiner

METHOD OF SEISMIC SOURCE MONITORING USING MODELED SOURCE SIGNATURES WITH CALIBRATION FUNCTIONS

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of seismic data acquisition. Specifically, the invention is a method of seismic source monitoring using modeled source signatures with calibration functions.

2. Description of the Related Art

Marine seismic exploration typically employs a submerged seismic source towed by a ship and periodically activated to generate an acoustic wavefield (a "shot"). The wavefield may be generated by a small explosive charge, an electric spark or arc, a vibrator, or, typically, a gun. The gun may be a water gun, vapor gun, or, most typically, an airgun. Each airgun contains a volume of air typically compressed to about 2000 psi (pounds per square inch) or more. An airgun abruptly releases its compressed air to create an air bubble, leading to an expanding sound wave in the water. The resulting wave front propagates downwardly into the earth beneath the water, reflects from subterranean earth layers, and returns upwardly toward the water surface. Seismic receivers, which are typically streamers of hydrophones that are also submerged and towed by the same or another ship, detect the reflected wave fronts, convert the detected wave fronts to electrical signals, and transmit those signals to a ship for storage and processing.

When a seismic source is triggered, it produces a complex output pressure pulse in the water. In an idealized situation in which the seismic source is a point source, such as a single airgun, and there is no sea surface, the emitted wave front is independent of direction and distance, except for spherical spreading. Converted to an electrical signal, the output pulse of an airgun would consist of a short wave train whose envelope displays an initial short, fast, positive rise in amplitude followed by several rapidly-decaying oscillations. The recorded wave train is called the signature of the seismic source.

In practice, a sea surface exists and is typically only meters away from the seismic source. The acoustic wave generated by the seismic source radiates by spherical spreading in all directions such that there is a downwardly traveling component as well as an upwardly traveling component. The water-air interface at the sea surface has a reflection coefficient typically close to a value of −1. The upwardly traveling component of the acoustic wave is reflected by the water surface and is reversed in polarity to become another downgoing component. This additional downgoing component is generally referred to as a "ghost". The ghost interferes with the direct wave to complicate the source signature.

Typically, a seismic source consists not of a single element, but of a spatially-distributed array of elements that generate direct arrivals plus the ghost components. This is particularly true of airguns, currently the most common form of marine seismic source. The spatial dimensions of an array of source elements may be comparable to the wavelengths of the acoustic waves themselves within the useful seismic frequency passband. Thus, there is no single source signature for an array. Rather, the source signature of an array in the near-field becomes a continuous function of both direction and distance. At distances large compared with the array dimensions, the dependence on distance in any particular direction becomes negligible. This region is called the far-field. It is the far-field signature that is useful for seismic data processing. For arrays of airguns, which typically extend over spatial dimensions of about 20 meters by 20 meters, the distance to the far-field is on the order of 250 meters.

Although modem airguns produce stable wavefields in a laboratory situation, the wavefields produced by arrays of airguns deployed at sea are not so stable. In a marine environment, the wavefields of airgun arrays vary from shot to shot because of physical factors such as airgun drop-outs; sea surface conditions affecting the ghost; and variations in the array geometry, airgun depth, pressure, airgun timing, water velocity, or sea temperature. If these source variations could be monitored accurately, the source variation data could be used to significantly enhance the quality of the resultant seismic data. Correcting for source variations may be particularly important in situations such as four-dimensional or time lapse seismic, such as reservoir monitoring. In these situations, very small differences in seismic data sets may otherwise be swamped by the source variations.

Shot to shot variations in marine seismic sources are not often monitored, primarily because it is difficult to do. However, methods of seismic source monitoring are currently in use. A first method, the far-field method, typically employs measurement of the vertically traveling signature with a far-field hydrophone. The far-field method, however, is unreliable because the position of the sensor drifts, only a single point in the wavefield is measured, and it is difficult to position the sensor (hydrophone) the required distance from the source. The far-field method often requires moving the seismic survey vessels and equipment to deeper waters to make the far-field measurements. Thus, the far-field method is difficult and expensive to do.

A second method of seismic source monitoring, the near-field method, employs measurement of near-field signatures, which can be analyzed to calculate the whole wavefield of the array. A primary example of this second method is known to those of ordinary skill in the art as the notional source method. A notional source signature is a normalized, idealized source signature that would be measured by a hydrophone at one meter distance from an airgun, if there were no surface reflection and no relative motion between the airgun bubble and the hydrophone. See, for example, the following two publications. The first publication is Ziolkowski, A., Parkes, G., Hatton, L., and Haugland, T., "The signature of an airgun array: Computation from near-field measurements including interactions", Geophysics, Vol. 47, No. 10 (Oct. 1982), pp. 1413–1421. The second publication is Parkes, G., Ziolkowski, A., Hatton, L., and Haugland, T., "The signature of an airgun array: Computation from near-field measurements including interactions—Practical considerations", Geophysics, Vol. 48, No. 2 (Feb. 1984), pp. 105–111.

The first publication, Ziolkowski et al. (1982), describes a theory of the interactions between bubbles produced by airguns in an array. Assuming that the bubbles are small compared with the wavelengths of seismic interest, the array of interacting oscillating bubbles is equivalent to a "notional" array of non-interacting oscillating bubbles. If there are n airguns in the array, then n independent measurements of the near-field pressure field of the full array may be used to determine the n notional source signatures. The signature of the array at any point in the water may then be calculated by linear superposition of these n notional source signatures. A spherical correction is also applied, in which the notional source signatures are scaled and time delayed relative to each other according to distance and direction. However, the number of near-field measurements must not be less than the number n of airguns in the array.

The second publication, Parkes et al. (1984), refines the solution of Ziolkowski et al. (1982) for the signature of an interacting array of airguns. An iterative technique is applied to calculate notional source signatures from the near-field measurements using hydrophones placed close (one meter) to each airgun. The amplitude variation effects of the forward motion of the hydrophones and the upward motion of the airgun bubbles with respect to each other are handled in a linear velocity model. However, continuous recording of the near-field signatures is required to recompute the wavefield if the radiation of the airgun array changes or becomes unstable.

The notional source method is further discussed in U.S. Pat. Nos. 4,476,550; 4,476,553 and 4,868,794. The first of these patents is U.S. Pat. No. 4,476,550, "Determination of far field signatures, for instance of seismic sources", filed Aug. 25, 1981 and issued Oct. 9, 1984 to Ziolkowski, A. M. and Stoffa, P. L. The second patent, also issued on Oct. 9, 1984, is U.S. Pat. No. 4,476,553, "Method of determining the signatures of arrays of marine seismic sources", issued to Ziolkowski, A., Hatton, L., Parkes, G., and Haugland, T. The third patent, issued to the same inventors as the '553 patent, is U.S. Pat. No. 4,868,794, "Method of accumulation data for use in determining the signatures of arrays of marine seismic sources", issued Sep. 19, 1989.

The first patent, the Ziolkowski et al. '550 patent, discloses a method used with towed marine seismic streamers for ascertaining the far-field signature of an array of airguns, each of which is small compared with the wavelength of the highest frequency of interest. The airguns are fired so that interactions between the airguns are kept negligible, by either separation in time or separation in space. For separation in time, the airguns are fired sequentially so that each airgun generates all its significant radiation before the next airgun is fired. For separation in space, the airguns are fired more than one at a time, but are separated by a distance of at least one wavelength of the lowest frequency of interest. The far-field signature of each unit is measured by a pressure-sensitive detector close to the airgun but in a region where the phase spectrum of the pressure field is independent of azimuth and range. The far-field signature of the array is derived from the measured signatures by summation.

The second and third patents, the Ziolkowski et al. '553 and '794 patents, disclose a method for determining the far-field signature of an array of n airguns. The array is actuated and the emitted pressure wave is measured by n hydrophones at n independent points whose positions with respect to the array are known. The n measurements are processed to form n simultaneous equations, which are then solved to produce n notional signatures of the n sources. Solving the simultaneous equations takes into account the interactions between the airguns. The signature of the entire array is then determined by superposing the n notional signatures.

The notional source method, however, has some intrinsic practical difficulties. As described in the Ziolkowski et al. (1982) publication, the number of seismic sources (airguns) must equal the number of independent measurements (hydrophones), to provide n well-determined simultaneous equations to solve. Thus, all n airguns and all n hydrophones must function at all times. In addition, the notional source method assumes that the water-air interface at the sea surface is a good planar reflector with a reflection coefficient close to −1. Otherwise, as described in the Ziolkowski et al. '553 and '794 patents, the number of unknown variables doubles to 2n, which means that the number of hydrophones must double to 2n.

Furthermore, the notional source method typically uses hydrophones approximately one meter from each airgun, as described in the Parkes et al. (1984) publication. A hydrophone placed near the airgun array records the primary source signature from the airgun plus a much smaller ghost reflection from the sea surface. Additionally, each hydrophone records contributions from all the surrounding airguns. Both the ghost reflections and the relative motion between the hydrophones and the bubbles created by the hydrophones must be accounted for in the notional source method. Thus, the notional source method requires precise measurements of the separation between airguns and hydrophones as well as precise measurements of the spacing between airguns in the array.

Thus, a need exists for a method for determining an accurate far-field seismic source signature for an array of seismic sources.

BRIEF SUMMARY OF THE INVENTION

The invention is a method of seismic source monitoring using modeled source signatures with calibration functions. Physical parameters are measured for a plurality of seismic sources, preferably for each activation of the seismic sources. Calibration functions are obtained and the measured physical parameters and the calibration functions are applied to a model, which generates a calibrated source signature for the array of seismic sources. Alternatively, the measured physical parameters are applied to a model, which generates a modeled source signature, and then the calibration functions are applied to the modeled source signature to generate the calibrated source signature. Alternatively, modeled source signatures are generated for each seismic source and then the calibration functions are applied to the modeled source signatures to generate a calibrated source signature for each seismic source. Then the calibrated source signatures for each seismic source may be combined, preferably by linear superposition, to generate the calibrated source signature for the array of seismic sources.

The calibration functions are preferably determined by the following method. Physical parameters are measured for an activation of a plurality of seismic sources. The measured physical parameters are applied to a model, which generates a modeled source signature for each seismic source. Source signatures are measured for the activation of the seismic sources, which generates a measured source signature for each seismic source. Differences are determined between the modeled source signatures and the measured source signatures for each seismic source. Then calibration functions are determined for each seismic source that correct for the differences between the modeled and measured source signatures.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method of seismic source monitoring for an array of seismic sources. The invention makes use of measurements of physical parameters which affect the wavefield generated by the array, a computer model to estimate a source signature for the array from the physical parameter measurements, and calibration functions to improve the estimate of the source signature from the model. The method of the invention produces a source signature which is a continuous function of distance and direction. Thus, the term "source signature", when utilized with reference to the method of the invention, will designate a three-dimensional wavefield rather than a conventional one-dimensional source signature.

In one embodiment of the invention, measurements are made of physical parameters for an activation of the array of seismic sources. These measurements of physical parameters are applied to a computer model that outputs an estimate of a source signature for the array of seismic sources. This estimate of a source signature generated by applying physical parameters to the model is referred to herein as a modeled source signature. Calibration functions are applied to the modeled source signature to generate an improved estimate of the source signature of the array. This improved estimate of the source signature after application of the calibration functions is referred to herein as a calibrated source signature.

In another embodiment, the calibration functions are applied to the model and included in the model, so that a calibrated source signature is generated by applying the physical parameters to the model.

In another embodiment, the invention uses a model that outputs a single estimated source signature for the entire array of seismic sources. In another embodiment, the invention utilizes a model that outputs a separate estimated source signature for each of the seismic sources in the array. The multiple estimated source signatures may then be combined to give a single estimated source signature for the entire array of seismic sources.

In a further embodiment, the calibration functions used above are obtained from a calibration test. In this calibration test, measurements are made of physical parameters for an activation of the array of seismic sources. These measurements of physical parameters are applied to a computer model that outputs a modeled source signature. For the same activation of the array of seismic sources, measurements are made of a source signature for each seismic source, preferably by hydrophones. These source signatures are called measured source signatures to distinguish them from the modeled source signatures. The modeled source signatures and the measured source signatures are then compared for each seismic source, to determine the differences between the signatures. Calibration functions are determined that correct for the differences between the modeled source signatures and the measured source signatures for each seismic source.

The method of the invention will be illustrated by embodiments employing arrays of guns, particularly airguns, as seismic sources, although the invention is not restricted to airguns as seismic sources. In the case of airguns, the preferred set of measured physical parameters comprises individual airgun parameters, airgun array parameters, and environmental parameters. These parameters include, but are not limited to, airgun depths, airgun pressure, airgun drop-outs, full three-dimensional geometry of the array and sub-arrays, airgun timing, water temperature, and atmospheric pressure. Some of these parameters are measured during each shot, that is, each time the entire array of airguns is activated. Other parameters change more slowly and can be measured less often. The following is a discussion of the physical parameters and their measurement.

The airgun depth parameter is needed to calculate the sea surface reflection, or ghost. Additionally, airgun depth can be used to calculate the external pressure on the air bubble generated by the airgun, which has a substantial effect on seismic source signatures. This pressure on the air bubble is caused by the weight of the column of water above the airgun plus the weight of the column of air above the water. The weight of the column of air can be calculated from a measurement of atmospheric pressure. The weight of the column of water can be calculated from a measurement of airgun depth, if the sea surface is calm. However, if the sea surface is irregular, then the hydrostatic pressure at the airgun should preferably be measured directly, rather than calculated from an airgun depth that may not be well-defined. The airgun depth and hydrostatic pressure parameters are typically measured for each shot. The atmospheric pressure parameter, if needed, is typically not measured for each shot when the pressure is stable. However, atmospheric pressure can change rapidly when a pressure front arrives.

The airgun pressure parameter means the internal airgun pressure at the time of airgun firing. The gun pressures are measured by pressure sensors typically located within the airlines supplying the airguns, but any other means known in the art are within the scope of the invention. Airgun pressure is typically measured for each shot.

The airgun drop-out parameter means the airgun firing failure rate, the set of airguns that fail to fire on each shot. Airgun drop-out can thus have a large effect on the source signature generated by a source array. The airguns in an array are typically of different sizes, so different combinations of the airguns will generate different source signatures for the entire source array. Airgun drop-out is typically measured for each shot.

The three-dimensional geometry parameter means the relative positions of all the elements of the airgun array. Since the airgun array may also comprise sub-arrays of airguns, the geometry includes the relative positions of airguns within sub-arrays as well as the relative positions of sub-arrays within the entire array. The array geometry determines how the individual air bubbles created by the airguns interact with each other. These bubble interactions have a significant effect on the generation of the source signature for the entire source array. Relative positioning of the sub-arrays can be measured by acoustic positioning sensors or any other positioning system known in the art which gives the required relative accuracy. If the array is not rigid, then airgun geometry is typically measured for each shot.

The airgun timing parameter means the relative timing of the firing of each airgun. This timing not only affects the synchronization in the total signature, but it also has a significant impact on the interaction effects between the airgun bubbles. Thus, airgun timing is preferably measured to high accuracy. Airgun timing is typically measured for each shot.

The water temperature parameter means the water temperature at the depths of the airguns. Water temperature affects the emitted wavefield in two ways. First, the water temperature affects the thermodynamics of the expanding bubble. Second, the water temperature affects the density of the water and hence, the velocity of sound in the water. This change in velocity, in turn, affects the time delays, which are coupled to the effects caused by interaction between the bubbles generated by the different airguns. Water temperature can be expected to be stable over a typical array size. Thus, temperature need not be measured at each seismic source location on the array. It may be sufficient to measure at only one location for the entire array. Water temperature is measured on the timescale on which it varies, which need not be for every shot.

In an alternative embodiment, additional parameters describing sea surface conditions may be measured. The sea surface is a stable and near perfect reflector for acoustic radiation in good weather conditions. However, as sea conditions deteriorate, waves and swell height begin to affect the ghost reflection part of the source signature.

In further alternative embodiments, other physical parameters may also be measured and employed in a model for estimating seismic source signatures. For the typical case of airgun arrays, these other parameters may include, but are not limited to, airgun types, airgun volumes, airgun port size, and airgun port open-time. These airgun parameters may affect the size of the air bubbles generated by the airguns. In yet further alternative embodiments, other physical parameters such as water velocity, and a salinity profile of the water may be measured. These water parameters may affect the speed of the expansion and movement of the airgun bubbles. These water parameters may not change much locally, but may be very different in another location.

The measured physical parameters are applied to a model. The invention preferably uses a computer model of an array of airguns to estimate the acoustic wavefield generated by the air bubbles from the airguns in the array. The use of such models to estimate source signatures from seismic sources is well known in the art.

Figure 1:
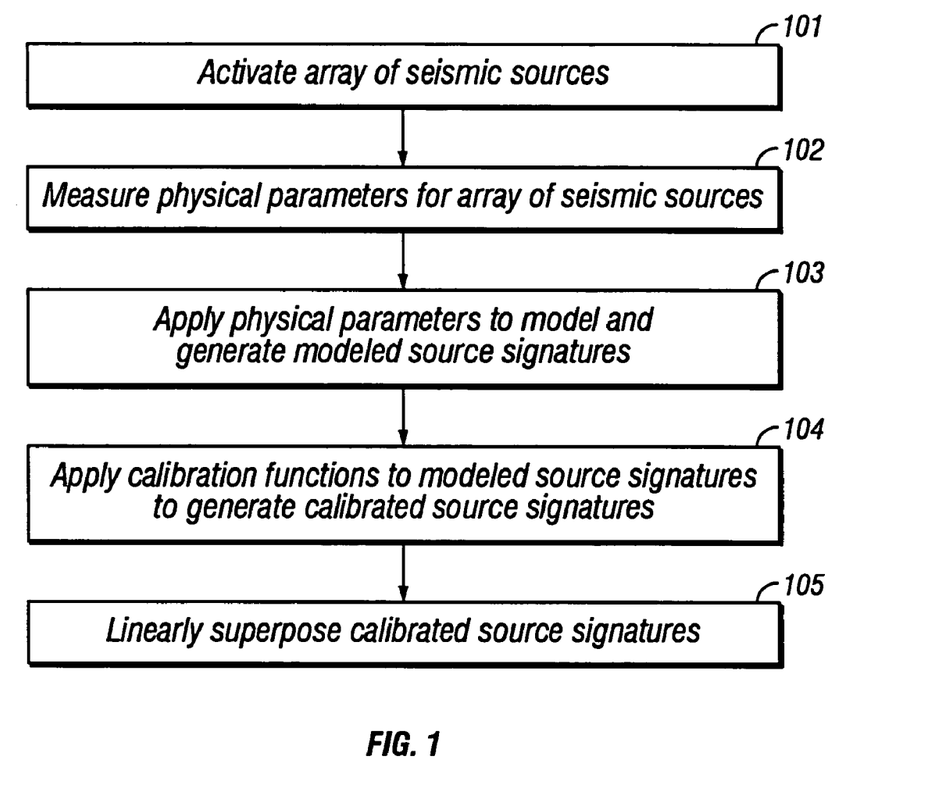
FIG. 1 is a flowchart illustrating the processing steps of an embodiment of the method of the invention for seismic source monitoring.

FIG. 1 shows a flowchart illustrating the processing steps of an embodiment of the invention. At step 101, an array of seismic sources to be monitored is activated. Typically, the seismic source array is monitored over a periodic sequence of activations (shots).

At step 102, physical parameters are measured for the array of seismic sources activated in step 101. Some measurements are made for each activation of the airgun array, while others are made less often, as needed. The physical parameters and their measurement are described above. The physical parameters should be those which determine the characteristics of the oscillating air bubbles generated by the seismic sources in the array. The measurements are preferably made by a system of sensors in the vicinity of the array.

At step 103, the physical parameters measured in step 102 are applied to a model and a modeled source signature is generated by the model. The use of seismic source models to generate modeled source signatures is well known to those of ordinary skill in the art. In one embodiment, a single modeled source signature is generated by the model as an estimated source signature for the entire array. In another embodiment, a separate modeled source signature is generated by the model as an estimated source signature for each seismic source in the source array.

At step 104, calibration functions are applied to the modeled source signatures from step 103, thereby generating calibrated source signatures. In one embodiment, in which a single modeled source signature is generated by the model, this application of calibration functions to the single modeled source signature generates a single calibrated source signature for the entire source array. In another embodiment, in which a modeled source signature is generated by the model for each seismic source, this application of calibration functions to each modeled source signature generates a calibrated source signature for each seismic source.

In a further embodiment, the calibration functions are incorporated into the seismic source model discussed with reference to step 103. In this embodiment, the model outputs a calibrated source signature (or signatures) instead of a modeled source signature (or signatures). In another embodiment, the step of applying the calibration functions is separate from the model. In this embodiment, the calibration functions are applied to the modeled source signature (or signatures) generated by the model to generate the calibrated source signature (or signatures). The invention is illustrated in the flowchart in FIG. 1 with step 103 of generating model source signatures from a model separate from step 104 of applying calibration functions to the modeled source signatures. This separation of model and calibration functions is for the sake of illustrative clarity only and is not a limitation on the invention.

At step 105, the calibrated source signatures for each of the seismic sources in the array are combined, if desired, to generate a single calibrated source signature for the entire array. Preferably, the calibrated source signatures are linearly superposed. Linear superposition includes, but is not limited to, linear addition and linear time-shifting.

In a recapitulation of a preferred implementation of the invention, the seismic source array is activated (step 101) and the physical parameters are measured (step 102) and applied to the model (step 103) for all the array seismic sources together. Then the calibration functions are applied (step 104) to the modeled source signature for each seismic source individually and the individual calibrated source signatures are then combined together (step 105) to give a source signature for the entire array. All of these steps (101–105) may then be repeated.

The method of the invention produces a source signature which is a three-dimensional wavefield, as a continuous function of distance and direction, rather than just a one-dimensional source signature. Thus, further seismic processing, as is well known in the art, can be done with a three-dimensional source signature instead of a conventional one-dimensional source signature. One example of this further processing is solving a three-dimensional deconvolution of the three-dimensional source signature, rather than just using the vertical-traveling far-field source signature as a one-dimensional approximation of the source signature.

The seismic source monitoring method of the invention uses sensor measurements of physical parameters applied on a shot by shot basis to a model of an airgun array. However, the modeled source signatures generated by the model may only be accurate to a few percent. Therefore, the method of the invention uses calibration functions to improve the estimated source signatures generated by the model. These calibration functions, applied in step 104 of FIG. 1, correct for the differences between source signatures obtained from the model and source signatures obtained from field measurements.

Figure 2:
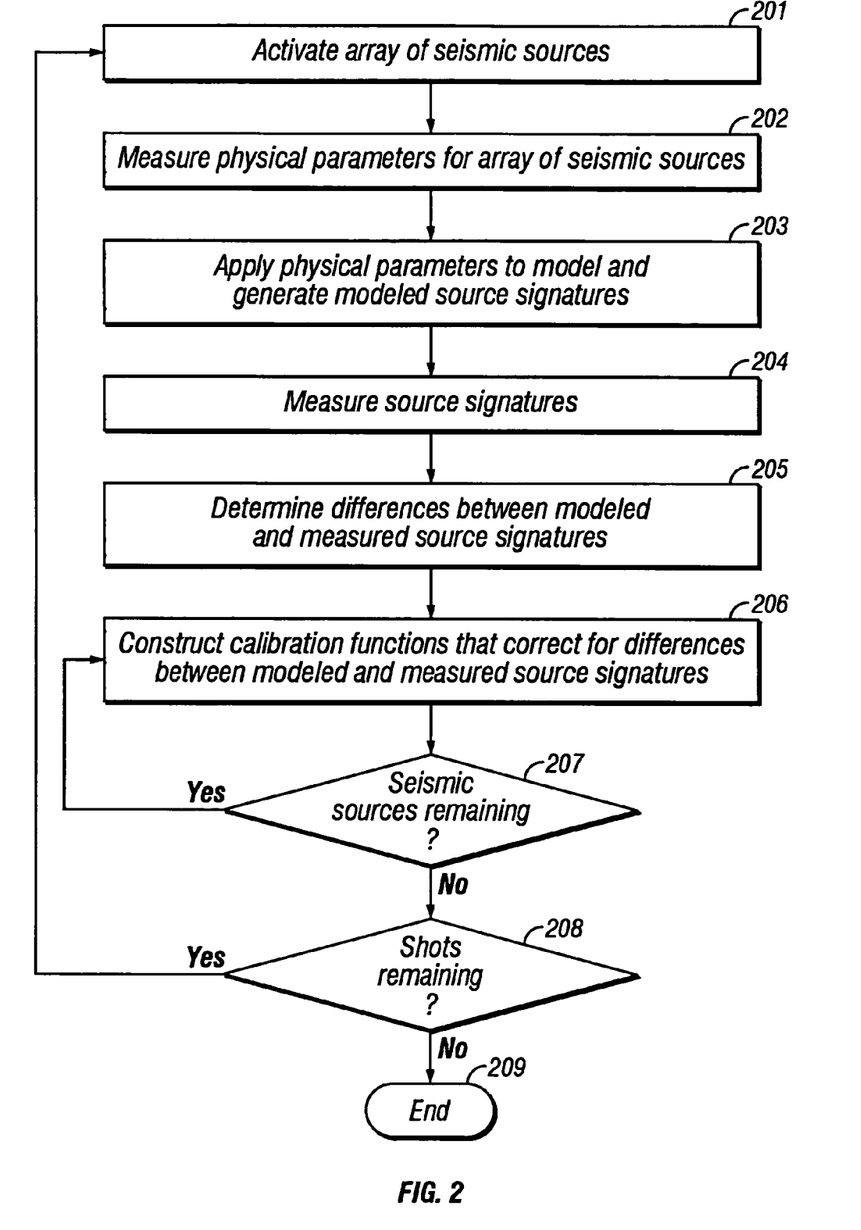
FIG. 2 is a flowchart illustrating the processing steps of an embodiment of the method of the invention for constructing calibration functions.

The calibration functions are preferably obtained for each seismic source in the seismic source array to be monitored. The calibration functions are also preferably obtained for an anticipated range of values of the physical parameters measured in step 102, above. The calibration functions may be stored in computer memory after their construction and retrieved as they are needed for application to modeled source signatures. In a preferred embodiment, the calibration functions are constructed from measurements of the array seismic sources made in field tests. These measurements include recording near-field source signatures as well as measuring physical parameters for the activated source array. The measured physical parameters are modeled to generate modeled source signatures. The modeled source signatures are compared to the measured source signatures. Then the calibration functions are calculated to correct for the differences between the modeled source signatures and the measured source signatures. FIG. 2 shows a flowchart illustrating the elements of an embodiment of the method of the invention for constructing the calibration functions.

At step 201, an array of seismic sources is activated in a sequence of shots. Each shot is an activation of the entire array of seismic sources. The array of seismic sources is preferably as discussed in step 101 of FIG. 1, above.

At step 202, physical parameters are measured for the array of seismic sources from step 201. The physical parameters are preferably as discussed above.

At step 203, the physical parameters measured in step 202 are applied to a model and a modeled source signature is generated by the model for each seismic source. The model is preferably as discussed with reference to step 103 of FIG. 1, above.

At step 204, source signatures are measured for each seismic source for the seismic source activation. In a preferred embodiment, near-field source signatures are measured by hydrophones positioned approximately one meter from each seismic source while the entire seismic source array is activated. There are other possible measurements, which could be used as the basis of calibration. These include mid-field and far-field measurements, or a combination of near-, mid-, and far-field measurements. The near-field for a typical seismic source array extends out to a distance on the order of a few tens of meters (approximately 25 m). The far field begins at a distance on the order of a few hundreds of meters (approximately 250 m). The mid-field exists at the distances in between. Additionally, calibration functions could be calculated from shots in which single airguns are fired. These field measurements should be as accurate as possible, since the quality of the calibration functions for the source signatures depend upon the quality of these calibrating measurements.

At step 205, differences between the modeled source signatures from step 203 and the measured source signatures from step 204 are determined. In a preferred embodiment of the method of the invention, a computer algorithm known to those of ordinary skill in the art picks the primary and bubble peaks of any source signature. Applying this algorithm to modeled and measured signatures of a seismic source provides the information to compare the source signatures and then compute the corresponding calibration functions. In one embodiment, the phase of the modeled and measured source signatures is compared. A corresponding calibration function is constructed which stretches or compresses a modeled source signature between each pair of bubble peaks, so that the phase of the bubble peaks matches in the modeled and measured source signatures. Similarly, the amplitude of the modeled and measured source signatures is compared. This corresponding calibration function applies a time dependent amplitude scaling factor, calculated at the bubble positions and interpolated between them.

The measured source signatures from step 204 are converted, if necessary, to a form compatible for comparison with the modeled source signatures from step 203. In the preferred embodiment of the invention, the modeled source signatures are generated by the model in the form of notional source signatures. Thus, in the preferred embodiment, the measured source signatures are converted to notional source signatures for comparison. However, converting to notional source signatures is not a requirement of the invention. For example, the conversion may include, but not be limited to, removing the ghost and normalizing the source signature to a reference distance between source and sensor, just as notional source signatures have a normalized distance between source and sensor of one meter.

Figure 3:
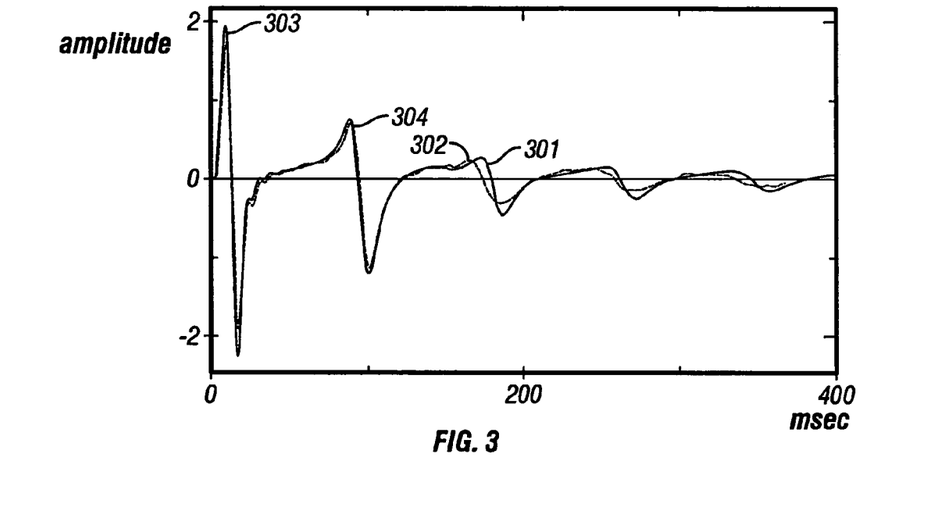
FIG. 3 is a plot showing a comparison between a modeled source signature and a measured far-field source signature of a single airgun.

FIG. 3 is a plot showing a comparison between a modeled source signature 301, shown as a solid line, and a measured vertically-traveling far-field source signature 302, shown as a dashed line, of a single 110 cubic inch airgun deployed at 6 meters depth. In general, the modeled source signature does a good overall job of estimating the source signature. Looking at specific features, the accuracy of the model in predicting the initial peak amplitude 303 is better than 10%, whereas the accuracy in predicting the phase and amplitude of the first bubble 304 is better than 5%. However, the prediction of the phase and amplitude of later bubbles is less accurate. Thus, the accuracy of the modeled source signature slowly varies over time.

Figure 4:
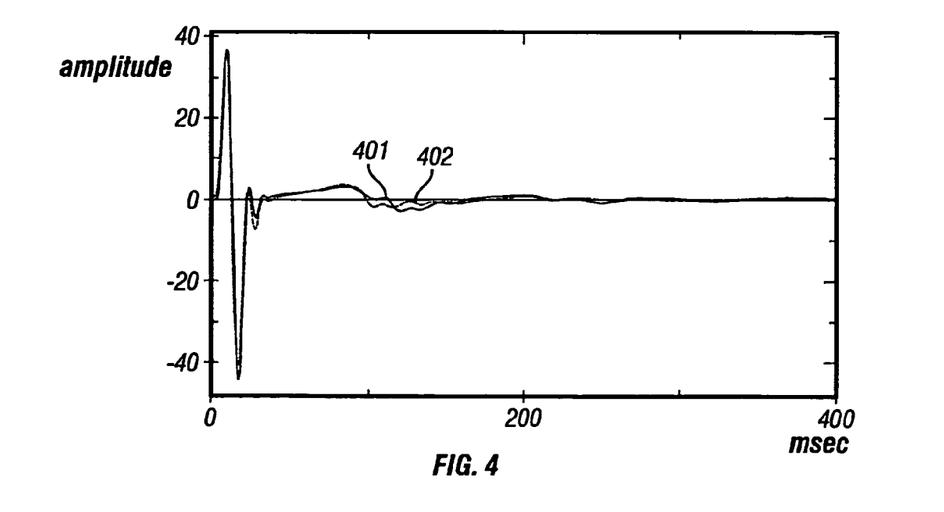
FIG. 4 is a plot showing a comparison between a modeled source signature and a measured far-field source signature of an airgun array.

FIG. 4 is a plot showing a comparison between a modeled source signature 401, shown as a solid line, and a measured vertically-traveling far-field source signature 402, shown as a dashed line, of a 2920 cubic inch airgun array deployed at 6.25 meters depth. The array is a mixture of Sleeveguns and Bolt 1500 LL guns. Again, the modeled source signature does a good job of estimating the main features of the source signature of the array. The prediction of the peak amplitude 403 of the source signature and its primary to bubble ratio are accurate to better than 5%. The overall shape of the modeled source signature is very good. The most noticeable error is in some of the phase characteristics of the bubble at between 100 and 120 msec.

The model utilized in step 203 is accurate at predicting changes in the source signatures due to variations in the physical parameters from shot to shot. However, the absolute error in the modeled source signatures is often greater than the shot to shot variations in the modeled source signatures resulting from variations in the physical parameters. The method of the invention improves the estimated source signatures of the model with calibration functions.

Referring again to FIG. 2, at step 206, calibration functions for each seismic source are constructed that correct for the differences determined in step 205 between the modeled source signature from step 203 and the measured source signature from step 204. The calibration functions are discussed further below.

At step 207, it is determined if any more seismic sources remain in the array of seismic sources for which calibration functions have not been constructed. If the answer is yes, that more seismic sources remain, then the process returns to step 206 to construct calibration functions for another seismic source in the array. If the answer is no, that no more seismic sources remain, then the process continues on to step 208.

At step 208, it is determined if any more shots (activations of the entire array of seismic sources) remain in the sequence of shots from step 201. If the answer is yes, that more shots remain, then the process returns to step 201 to activate the array of seismic sources again. If the answer is no, that no more shots remain, then the process continues on to step 209 to end.

At step 209, the process ends. Calibration functions have been determined for each seismic source in an array for each of a sequence of shots under a range of physical parameter values. In a recapitulation of a preferred method of the invention for constructing calibration functions for a seismic source array, the entire array is activated (step 201) and the physical parameters are measured (step 202) and applied to the model (step 203) for all the seismic sources together in the array. Then source signatures are measured (step 204), compared to modeled source signatures (step 205), and used to derive calibration functions (step 206) for each seismic source individually (step 207) in the array. Then all of these steps (201–207) are repeated for each activation of the entire array (208).

The notional source method relies on there being as many hydrophone signals as there are airguns in the array. If a single hydrophone fails, the equations are under-determined and insoluble, which causes a serious problem for the method. The method of the invention relies on a variety of sensor measurements. The method of the invention is less sensitive to failures in the sensors. For example, if some of the sensors for physical parameters on a sub-array fail, then interpolation between the other sensors can still give an excellent result. This robustness gives the method of the invention a valuable advantage over the notional source method in a production environment.

The calibration functions are used in the invention to correct the differences between the source signatures from the model and the source signatures from the measurements without disturbing the accuracy of the relative shot to shot variations estimated by the model. One embodiment is a calibration function which picks the times of the positive bubble peaks. This allows the small phase errors in these bubble peaks to be corrected and a straightforward amplitude correction function to be applied. This embodiment will be referred to as the first calibration function. Utilizing just this first calibration function gives good results. The largest errors are usually in the negative parts of the calibrated source signature, between the bubble pulses. In a further embodiment, these errors may be minimized by picking the minima between bubbles, as well as the maxima defined by the bubble peaks.

In a further embodiment, each calibration function consists of a series of correction functions, which are tuned for and applied to each modeled source signature. In particular, these correction functions are applied to notional source signatures output by the preferred model. These are modeled source signatures output by the model that can be superposed to calculate the array signature in any direction. In a yet further embodiment, there are two correction functions.

The first correction function is a phase correction function applied to the modeled source signature. This phase correction function stretches or compresses a modeled source signature in the time domain to correct primary periodicity or phase errors in the modeled source signature. For example, if the second bubble period was in error by 2%, this correction function would gradually introduce a 2% time stretch to correct the period. This phase correction function, which is slowly varying in time, retains the shot to shot variations of the modeled source signature.

The second correction function is an amplitude correction function applied to the modeled source signature. This amplitude correction function multiplies the source signature by a scaling function in the time domain to correct primary amplitude errors in the modeled source signature. For example, if the amplitude of the third bubble in the modeled signature was 10% too low this correction function would scale that bubble up by 10%. Again, this amplitude correction function, which is slowly varying in time, retains the shot to shot variations of the modeled source signature.

In an alternative embodiment, one or more additional correction functions may be added to the series of correction functions. For example, an additional correction function may apply several further small corrections to the details of the source signature. These corrections could be reshaping functions. For example, if the predicted shape of the primary peak is slightly wrong, then the peak can be reshaped.

In a preferred embodiment, the method of the invention relies on computing a set of calibration functions for each airgun and applying this set to the modeled source signatures. The calibration functions are preferably obtained beforehand and then simply applied to all modeled source signatures. The invention does not preclude having different sets of calibration functions for different parameter ranges and interpolating between them, for example, a set at 2000 psi and a set at 2500 psi. The accuracy of the method of the invention may be less accurate if the array parameters vary significantly from the values at which the measurements at which the calibration functions were made (for example, if the array were deployed at a significantly different depth). However this problem can be overcome by making measurements of the array over the range of variation likely to be encountered. Thus, an additional algorithm may be incorporated to choose or interpolate the calibration functions.

A number of alternative embodiments for calibration functions may be described in relation to the first calibration function discussed above, which aligns on bubble peaks only. A second calibration function embodiment aligns on the centers of the full width at half maximum (FWHM) of each peak. A third calibration function embodiment aligns on peaks and the minima between the peaks. A fourth calibration function embodiment aligns on peaks, minima, and also on zero crossings. A fifth calibration function embodiment aligns on the FWHM of peaks and troughs from the fourth embodiment. Finally, a sixth calibration function embodiment does a source signature division after the initial calibration done as in the fifth embodiment.

The calibration functions sometimes show a zigzag appearance in the amplitude correction curves. This is caused by a systematic difference between the amplitude error of the positive parts of the signature and the amplitude error of the negative parts of the signature. For example, consider a change in physical parameter, such as depth, which primarily affects the bubble period. For small changes in depth, a phase correction followed by the amplitude correction should work well. However, a change in bubble period which moves a peak on the changed signature onto a trough on the reference signature might require a very large parameter change for the first bubble, but a progressively smaller change for later bubbles. The result is that the amplitude correction for the negative part of the signature is applied to the positive part. The presence of the zigzag effect introduces significant error at this point.

To correct errors introduced by the zigzag effect, a further alternative embodiment employs a shot-adaptive method, which relies on the fact that the errors in the modeled source signatures are mainly systematic. Instead of computing a calibration function as before at the reference point, the amplitude and phase errors would be recorded for each peak and trough of the signature (and possibly phase errors for zero crossings). When monitoring the source during performance of a seismic survey, the peaks and troughs would be picked from the uncalibrated modeled source signatures for each shot. Shot variant calibration functions would then be calculated, which enforce peak alignment for the application of the amplitude correction curves. This alternative embodiment of the method of the invention should also improve the results when the gradient of the calibration curves is high. If the later parts of the source signature are of interest, then this shot-adaptive technique could offer an improvement.

Another alternative embodiment of the method of the invention is to add an additional calibration function obtained from a measured far-field source signature. A straightforward final amplitude and phase correction function could be used. The illustrated method for constructing calibration functions uses the notional source method as a reference. The reference calibration is done in good weather and in controlled conditions, in which the boat towing the sources and sensors is moving slowly. Under these conditions, the notional source method can be expected to be at its best. However, under seismic survey operational conditions, the accuracy of the notional source method deteriorates significantly, whereas the calibration method should maintain its accuracy. A final calibration from far-field measurements can increase the accuracy of the method of the invention.

Figure 5:
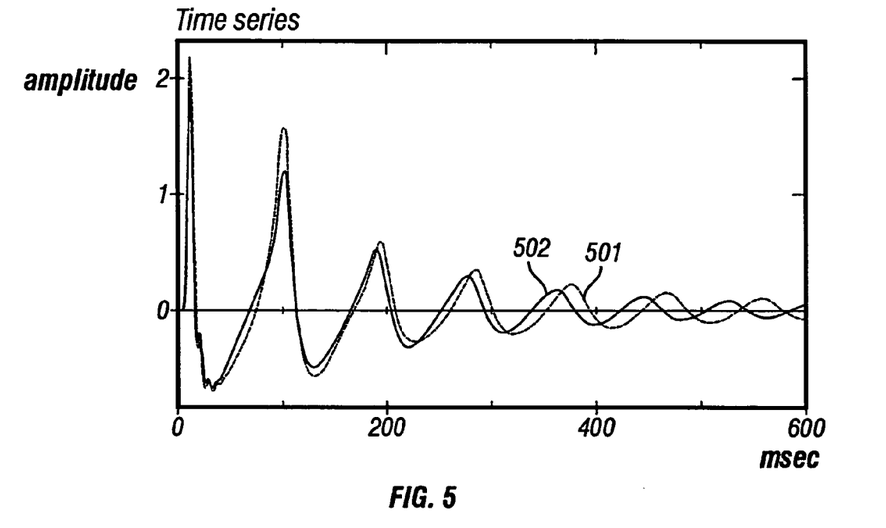
FIG. 5 is a plot showing a comparison between modeled and measured notional source signatures of an airgun, before correction of the modeled source signature by calibration functions.

A first example, shown in FIGS. 5–8, illustrates the use of the method of the invention with a single airgun. The airgun used in this example is a 150 cubic inch Sleevegun. FIG. 5 is a plot showing a comparison between modeled and measured notional source signatures of this airgun, before correction of the modeled source signature by calibration functions. A solid line 501 shows a modeled notional source signature and a dashed line 502 shows a notional signature calculated from a measured near-field source signature.

Figure 6:
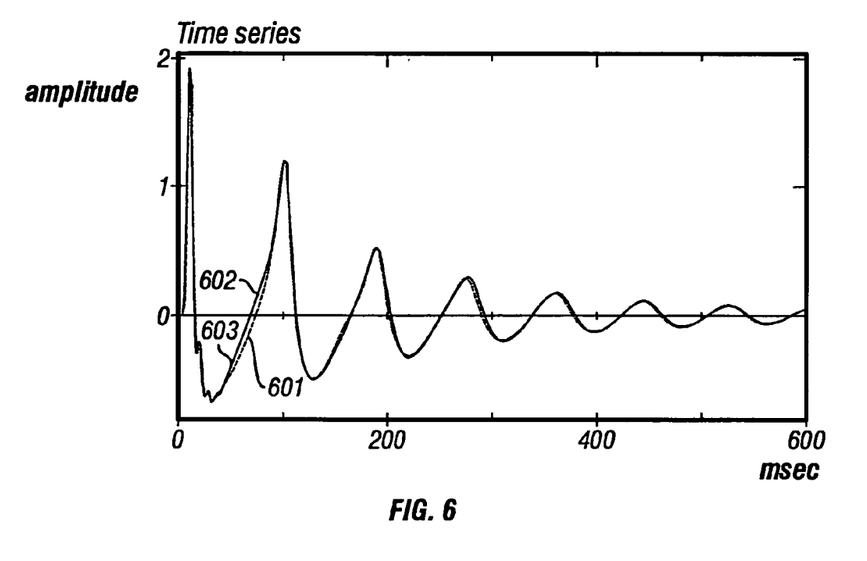
FIG. 6 is a plot showing a comparison between modeled and measured notional source signatures of the airgun, after correction of the modeled source signature by calibration functions.

FIG. 6 is a plot showing a comparison between modeled and measured notional source signatures of this airgun, after correction of the modeled source signature by calibration functions. The third calibration function, as described above, is utilized. The maxima and minima of the source signatures in FIG. 5 were picked to construct the phase and amplitude calibration functions. A solid line 601 shows a calibrated notional source signature and a dashed line 602 shows the notional signature calculated from the measured near-field source signature. The match is good, with the biggest discrepancy being in the shoulder 603 leading up to the first bubble. This discrepancy could be easily corrected by picking additional points in this area in the determination of the calibration functions.

Figure 7:
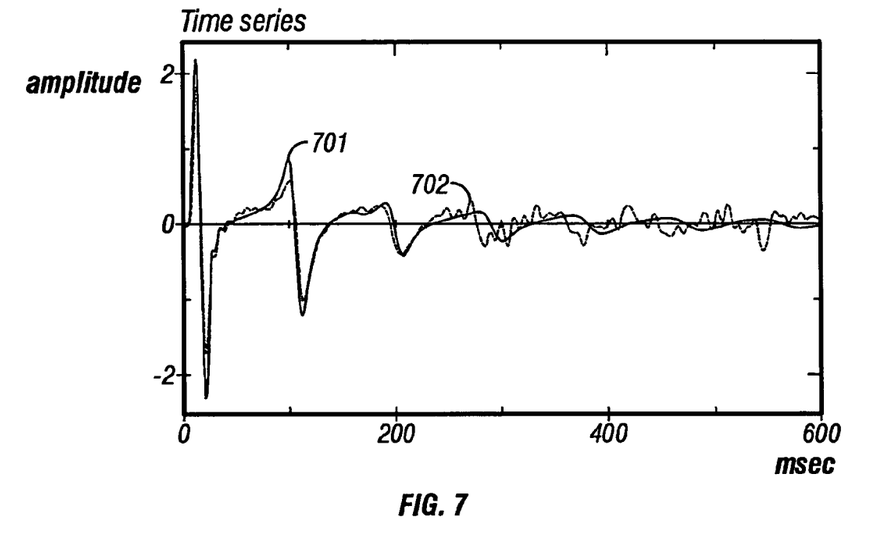
FIG. 7 is a plot showing a comparison between modeled and measured far-field source signatures of the airgun, before correction of the modeled source signature by calibration functions.
Figure 8:
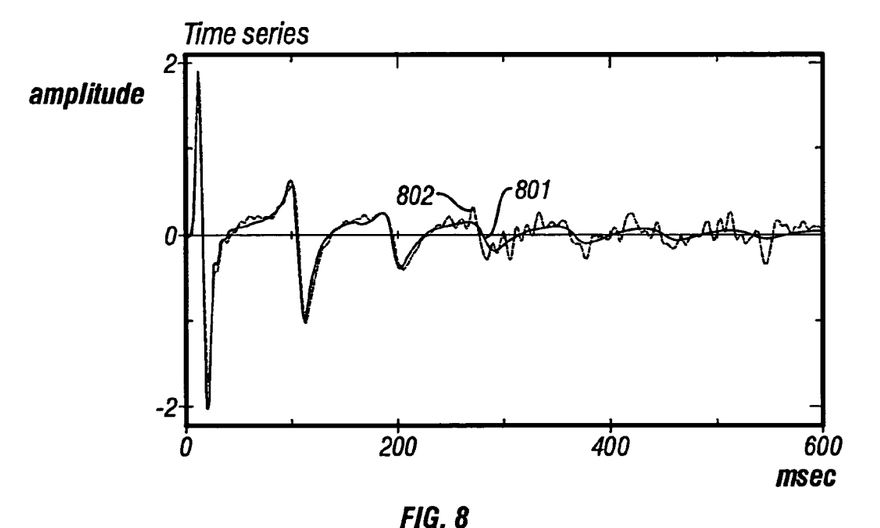
FIG. 8 is a plot showing a comparison between modeled and measured far-field source signatures of the airgun, after correction of the modeled source signature by calibration functions.

FIG. 7 is a plot showing a comparison between modeled and measured far-field source signatures of this airgun, before correction of the modeled source signature by the first calibration function, as described above. A solid line 701 shows a modeled far-field source signature and a dashed line 702 shows a measured far-field source signature. FIG. 8 is a plot showing a comparison between modeled and measured far-field source signatures of this airgun, after correction of the modeled source signature by the first calibration function. A solid line 801 shows a calibrated far-field source signature and a dashed line 802 shows the measured far-field source signature. Again, the agreement is good after calibration.

A second example, shown in FIGS. 9–12, illustrates the use of the method of the invention with an airgun array. The array used in this example is a 730 cubic inch airgun array, which is a mixture of seven 20 to 100 cubic inch Sleeveguns and a 250 cubic inch Bolt 1500 LL airgun, deployed at 6 meters depth.

Figure 9:
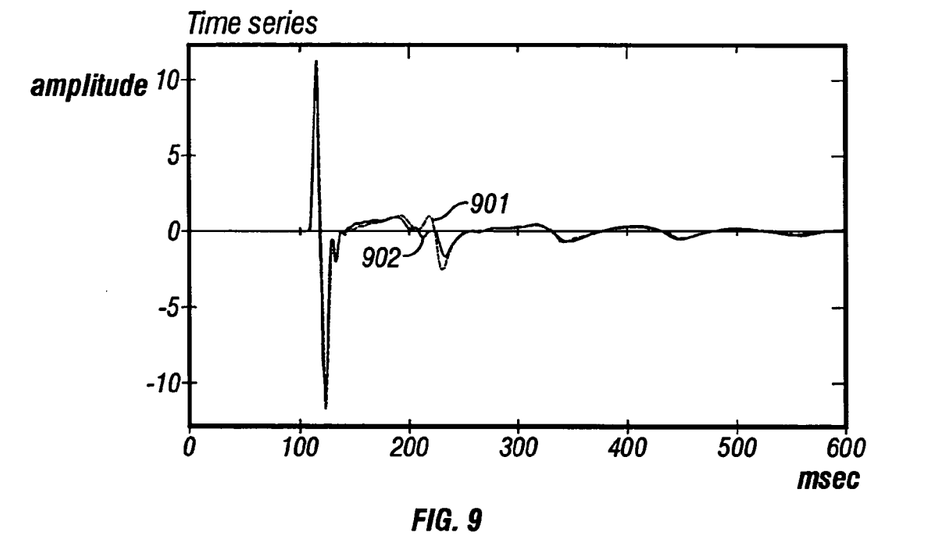
FIG. 9 is a plot showing a comparison between modeled and measured far-field source signatures of an airgun array, before correction of the modeled source signature by calibration functions.

FIG. 9 is a plot showing a comparison between modeled and measured far-field source signatures of this airgun array, before correction of the modeled source signature by the first calibration function. A solid line 901 shows a modeled far-field source signature and a dashed line 902 shows a far-field source signature calculated from near-field measurements by way of notional source signatures.

Figure 10:
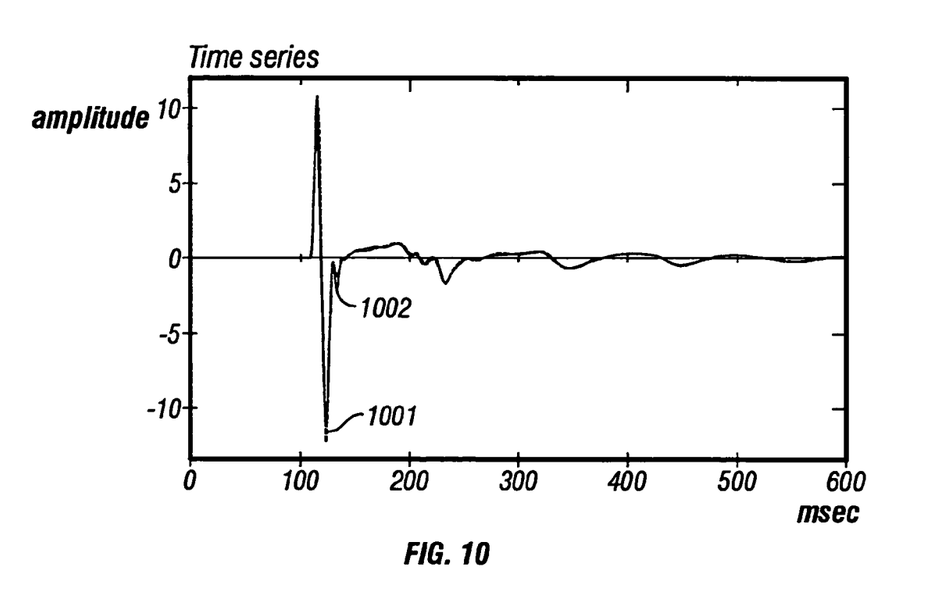
FIG. 10 is a plot showing a comparison between modeled and measured far-field source signatures of the airgun array, after correction of the modeled source signature by calibration functions.

FIG. 10 is a plot showing a comparison between modeled and measured far-field source signatures of this airgun array, after correction of the modeled source signatures by the first calibration function. A solid line 1001 shows a calibrated far-field source signature and a dashed line 1002 shows the far-field source signature calculated from near-field measurements by way of notional source signatures. This match is now very good, even using the first calibration function. An even better match can be expected, although for more work, with more sophisticated calibration functions.

Figure 11:
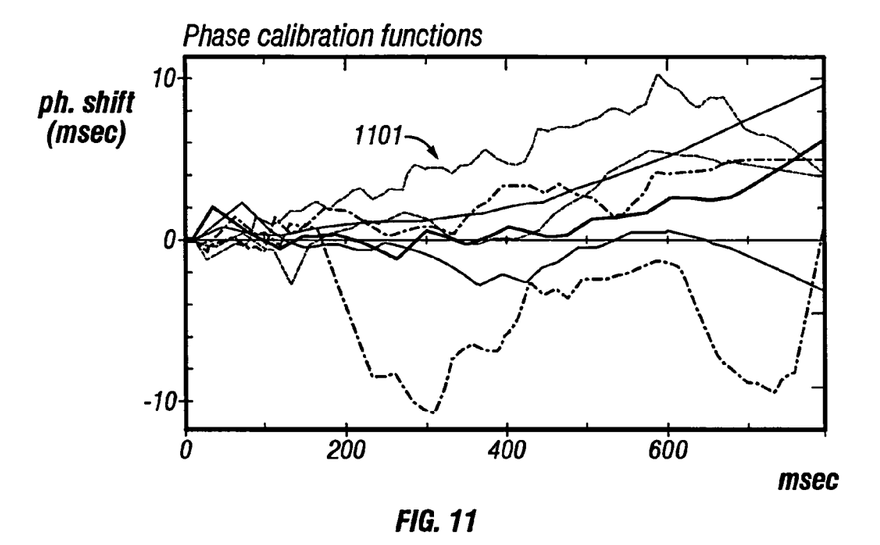
FIG. 11 is a plot showing representative phase calibration functions for each gun of the airgun array of FIG. 9.
Figure 12:
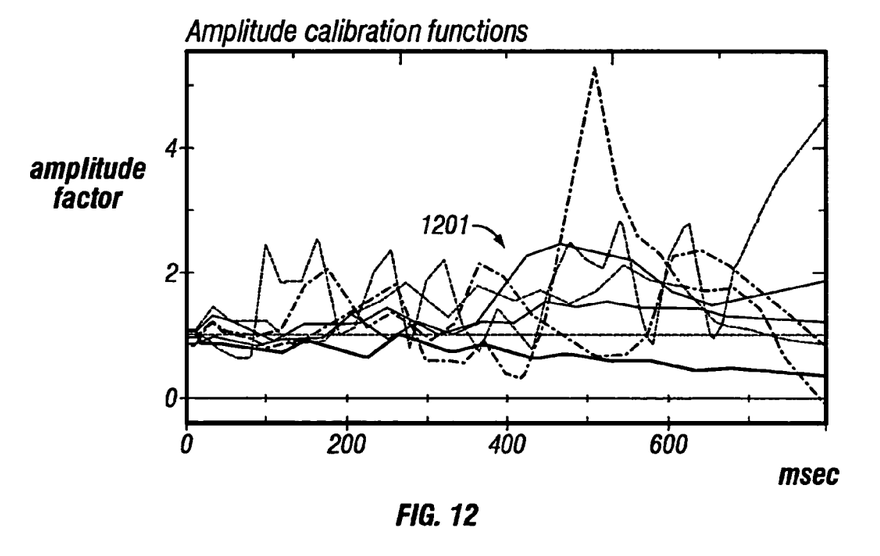
FIG. 12 is a plot showing representative amplitude calibration functions for each gun of the airgun array of FIG. 9.

FIGS. 11 and 12 are plots showing the representative phase 1101 and amplitude 1201 calibration functions, respectively, used to correct the modeled source signature 1001 in FIG. 10. The calibration functions are calculated from the notional source signatures, one for each airgun of the array.

Figure 13:
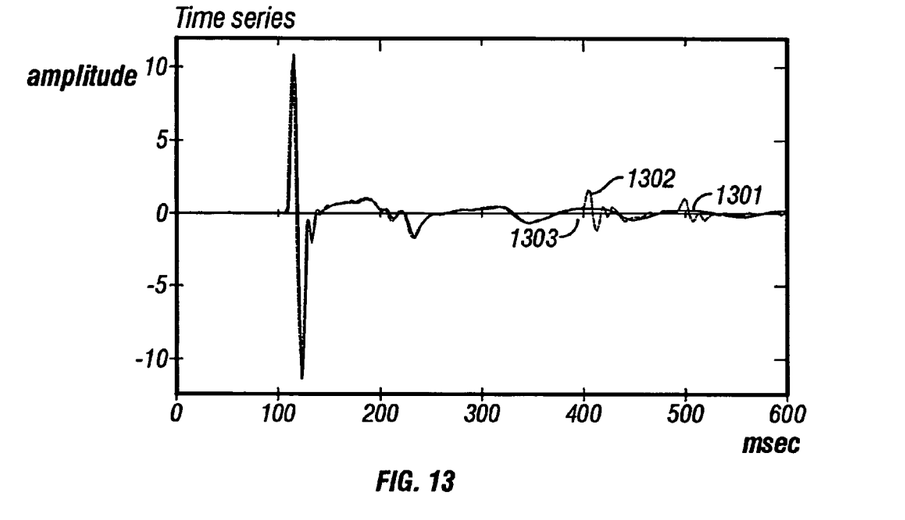
FIG. 13 is a plot showing a comparison between calibrated modeled and measured far-field source signatures of the airgun array.
Figure 14:
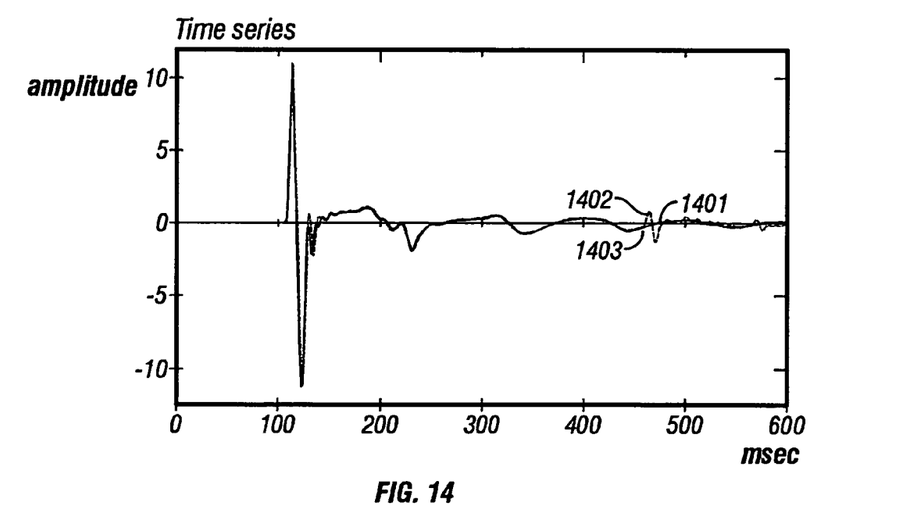
FIG. 14 is a plot showing a comparison between modeled and measured far-field source signatures of the airgun array as in FIG. 13, after correction of the modeled source signature by calibration functions at a different depth.

A third example, shown in FIGS. 13 and 14, illustrates the robustness of the method of the invention. FIG. 13 is a plot showing a comparison between calibrated modeled and measured far-field source signatures of the airgun array, after correction of the modeled source signature by the first calibration function. A solid line 1301 shows a calibrated far-field source signature and a dashed line 1302 shows the measured far-field source signature. The airgun array is at a depth of 6 meters. The agreement between the modeled and measured far-field source signatures is excellent. The sea-floor reflection 1303 is evident, starting at about 400 msec.

FIG. 14 is a plot showing a comparison between modeled and measured far-field source signatures of the airgun array, after correction of the modeled source signature by the first calibration function at a different depth. A solid line 1401 shows a calibrated far-field source signature and a dashed line 1402 shows the measured far-field source signature. In this case, however, the airgun array is at a depth of 6.5 meters while the calibration functions were calculated for a depth of 6 meters. Nonetheless, the agreement is still very good. Thus, the method of the invention works even in less than ideal situations, in which the measured parameters may differ between the calibration runs and the production runs. The sea-floor reflection 1403 is again evident, starting at about 460 msec.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method of real-time seismic source monitoring during the performance of a seismic survey, comprising:
    obtaining calibration functions prior to the seismic survey for physical parameters utilized to model a source signature for an array of seismic sources from comparison of measured near-field source signatures and modeled near-field source signatures;
    measuring said physical parameters during activations of said array of seismic sources;
    applying said measured physical parameters to a model, thereby generating a modeled source signature for said activated array of seismic sources; and
    applying said calibrations functions to said modeled source signature, thereby generating a calibrated source signature for said activated array of seismic sources.

2. The method of claim 1, wherein said measured physical parameters comprise one or more of the following: seismic source drop-out information, seismic source depths, seismic source geometry, seismic source internal pressures, seismic source relative timing, water temperature, and atmospheric pressure.

3. The method of claim 2, wherein said measured physical parameters further comprise sea surface conditions.

4. The method of claim 2, wherein said measured physical parameters further comprise one or more of the following: airgun types, airgun volumes, airgun port size, airgun port open-time, water velocity, and water salinity.

5. The method of claim 1, wherein said calibration functions are obtained from computer memory.

6. The method of claim 1, wherein said model is a computer model of oscillating airgun bubbles.

7. The method of claim 1, wherein a calibrated source signature is generated for each seismic source in said array of seismic sources and said calibrated source signatures for each seismic source are combined to generate said calibrated source signature for said array of seismic sources.

8. The method of claim 7, wherein combining the calibrated source signatures comprises linearly superposing the calibrated source signatures.

9. The method of claim 1, wherein a modeled source signature is generated for each seismic source in said array of seismic sources, a calibrated source signature is generated for each seismic source by applying said calibrations functions to said modeled source signature for each seismic source, and said calibrated source signatures for each seismic source are combined to generate said calibrated source signature for said array of seismic sources.

10. The method of claim 9, wherein combining the calibrated source signatures comprises linearly superposing the calibrated source signatures.

11. The method of claim 1, wherein obtaining calibration functions comprises:
    measuring the physical parameters for an activation of an array of seismic sources;
    applying said measured physical parameters to a model, thereby generating a modeled source signature for each seismic source;
    measuring source signatures for an activation of said array of seismic sources, thereby generating a measured source signature for each seismic source;
    determining differences between said modeled source signature and said measured source signature for each seismic source; and
    determining calibration functions that correct for said differences for each seismic source.

12. The method of claim 11, wherein the step of measuring source signatures comprises:
    positioning a seismic receiver in a near-field region with respect to each source; and measuring a near-field source signature for each source.

13. The method of claim 12, further comprising:
    computing notional source signatures from said near-field source signatures.

14. The method of claim 11, wherein the step of measuring source signatures further comprises:
    converting said measured source signatures to match said modeled source signatures in form.

15. The method of claim 11, wherein the step of determining differences further comprises:
    picking source signature features that define a primary peak of the source signatures; and comparing said source signatures at said picked source signature features.

16. The method of claim 15, wherein the step of determining differences further comprises:

picking source signature features that define at least one bubble peak of said source signatures.

17. The method of claim 16, wherein the step of picking source signature features comprises:

picking a maximum of said primary peak and said at least one bubble peak of said source signatures.

18. The method of claim 17, wherein the step of picking source signature features further comprises:

picking a minimum between said primary peak and said at least one bubble peak of said source signatures.

19. The method of claim 18, wherein the steps of picking source signature features further comprises:

picking zero crossings of said source signatures.

20. The method of claim 19, wherein the steps of picking source signature features comprise:

picking said source signature feature at a center of a full width at half maximum.

21. The method of claim 11, wherein the calibration functions correct for phase differences between said modeled and said measured source signatures.

22. The method of claim 11, wherein the calibration functions correct for amplitude differences between said modeled and said measured source signatures.

23. The method of claim 11, wherein each calibration function comprises:

a phase correction function to correct phase differences between said modeled and said measured source signatures; and an amplitude correction function to correct amplitude differences between said modeled and said measured source signatures.

24. The method of claim 1, wherein the steps of measuring said physical parameters and applying said measured physical parameters occur for each activation of said array of seismic sources.

* * * * *